(12) United States Patent
Oz et al.

(10) Patent No.: US 10,372,642 B2
(45) Date of Patent: Aug. 6, 2019

(54) SYSTEM, APPARATUS AND METHOD FOR PERFORMING DISTRIBUTED ARBITRATION

(71) Applicant: Intel Corporation, Santa Clara, CA (US)

(72) Inventors: Yanir Oz, Givat Ada (IL); Tsvika Kurts, Haifa (IL)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 15/279,762

(22) Filed: Sep. 29, 2016

(65) Prior Publication Data

US 2018/0089122 A1    Mar. 29, 2018

(51) Int. Cl.
*G06F 13/37* (2006.01)

(52) U.S. Cl.
CPC .................................. *G06F 13/37* (2013.01)

(58) Field of Classification Search
None
See application file for complete search history.

(56) References Cited

U.S. PATENT DOCUMENTS

| | | | | |
|---|---|---|---|---|
| 6,105,119 A * | 8/2000 | Kerr | .................... | G06F 13/4027 710/110 |
| 6,957,290 B1 | 10/2005 | Rowlands et al. | | |
| 8,060,647 B2 * | 11/2011 | Basu | ....................... | H04L 47/10 709/235 |
| 8,667,197 B2 | 3/2014 | Lai et al. | | |
| 8,688,881 B2 * | 4/2014 | Naylor | .................. | G06F 13/374 710/240 |
| 9,323,678 B2 | 4/2016 | Kumar et al. | | |
| 2008/0288689 A1 | 11/2008 | Hoang et al. | | |
| 2012/0110230 A1 * | 5/2012 | Ishikawa | ............... | G06F 13/364 710/241 |
| 2014/0240326 A1 * | 8/2014 | Cutter | ..................... | G06F 13/00 345/502 |
| 2014/0258620 A1 | 9/2014 | Nagarajan et al. | | |
| 2016/0188519 A1 * | 6/2016 | Wagh | .................. | G06F 13/4265 710/105 |
| 2017/0091108 A1 * | 3/2017 | Arellano | ............. | G06F 12/0888 |

FOREIGN PATENT DOCUMENTS

KR   10-2006-0000257   1/2006

OTHER PUBLICATIONS

International Searching Authority, "Notification of Transmittal of the International Search Report and the Written Opinion of the International Searching Authority," dated Dec. 7, 2017, in International application No. PCT/US2017/049729.

* cited by examiner

Primary Examiner — Michael Sun
(74) Attorney, Agent, or Firm — Trop, Pruner & Hu, P.C.

(57) ABSTRACT

In one embodiment, a distributed arbitration system for an interconnect includes: a first transmitter to output first data and a transmit identifier associated with the first data; and a first arbiter coupled to the first transmitter to receive the first data and to arbitrate between the first data and second data from a second arbiter coupled to the first arbiter, based at least in part on a change in a state of the transmit identifier. Other embodiments are described and claimed.

18 Claims, 13 Drawing Sheets

SYSTEM, APPARATUS AND METHOD FOR PERFORMING DISTRIBUTED ARBITRATION

TECHNICAL FIELD

Embodiments relate to arbitration techniques in computing systems.

BACKGROUND

In interconnect systems of computing devices, oftentimes multiple agents seek to access the interconnect concurrently. To fairly mediate access to the interconnect, one or more arbiters may be present. Known arbitration solutions include round robin or credit-based protocols, which attempt to accomplish good utilization while maintaining fairness between transmitters. While these solutions may be suitable for small scale implementations, they fail to keep fairness on large scales. For example, a furthest arbiter may experience starvation, while a closer arbiter may gain all the bandwidth. Also, current implementations are very complicated and require many control wires at very tight timing requirements.

DETAILED DESCRIPTION

Figure 1:
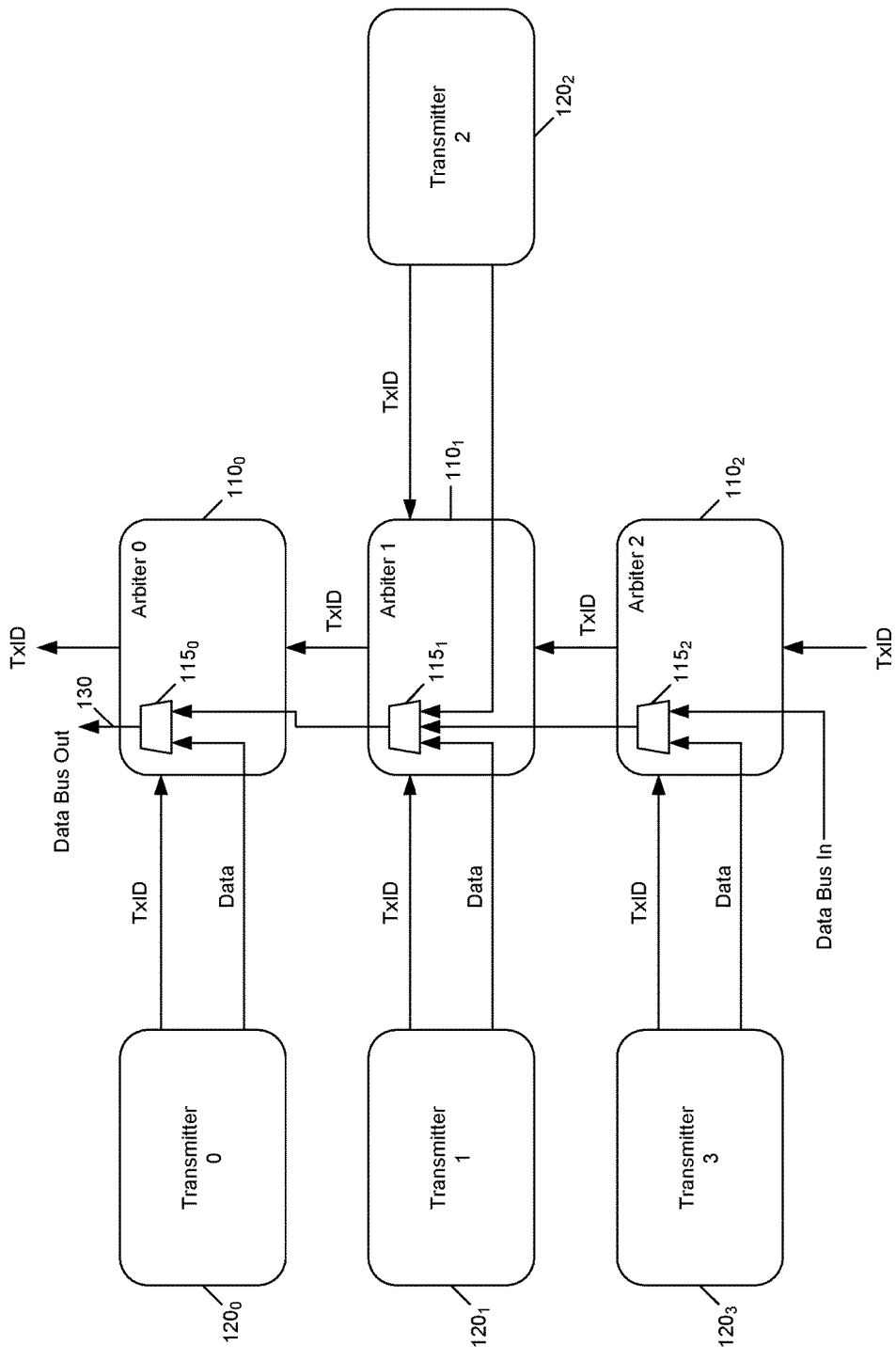
FIG. 1 is a block diagram of a portion of an arbitration system in accordance with an embodiment of the present invention.

In various embodiments, distributed data arbitration is performed with multiple arbiters in a manner to ensure fairness and that no starvation occurs between sources. At the same time, embodiments provide 100% bus utilization with balanced arbitration, without any limitations on the number of arbiters and transmitters. As will be described herein, a single information bit such as implemented via a single wire can be used, at least in part, to control arbitration. In addition, embodiments ensure no timing restrictions are caused by physical arbiter distance and minimize routing restrictions.

Note that data arbitration using an embodiment can occur via an unlimited number of serially-connected arbiters on a single bus or other interconnect such as a given fabric using a single data bus and as many data arbiters and transmitters as desired. In each logical cycle, an arbiter is configured to determine which of multiple information blocks, e.g., data packets, is selected for output. Note that information sources provided to an arbiter may include transmitter data (from one or more transmitters) and/or packet data driven from a previous (downstream) arbiter. The selected packet is forwarded to the next arbiter on the data bus.

In order to determine data order in the arbiters, embodiments use an arbitration technique in which a transmitter sends a single information bit (e.g., via a single wire), referred to as a transmit identifier (TxID), along with a corresponding data packet to the arbiter. Each transmitter is configured to toggle this TxID wire (e.g., from 0 to 1 or 1 to 0) according to a given arbitration policy, which may be implemented in hardware logic of the transmitters.

In different embodiments, multiple arbitration policies are possible. According to one arbitration policy, a transmitter may toggle this TxID upon the arrival of every new valid data chunk to be transmitted. In another example, the transmitter may toggle the TxID upon every new packet arrival, e.g., in cases where the packet size is larger than the bus such that a packet is split into multiple data chunks for transmission. In this case, the transmitter may be configured to only toggle TxID upon the completion of the packet transfer, e.g., after multiple cycles. In another example, a transmitter may be configured to force TxID to toggle after a fixed number of slots, e.g., after four clocks. In this example, TxID may be toggled even in the middle of a packet. For this mode, a packet format may include a header to support transfer of fragmented packets. In other cases, a mix of the above options, or other configurations to control bus access may be used.

Note that in embodiments, this TxID may be used to control bandwidth of transmitters. For example, in the case of two transmitters sharing the same data bus: one transmitter may be configured to toggle TxID every new valid data and the second transmitter may be configured to toggle TxID every two data. In this case, the second transmitter receives ⅔ of the bus bandwidth and the first transmitter receives ⅓ of the bus bandwidth. Please note that if the second transmitter has nothing to send on the data bus, the first transmitter may receive 100% of the bus bandwidth. Note that as long as TxID is toggled with consistent conditions, fairness is guaranteed. Also note that the initial value of the TxID has no meaning and has no dependency on any other transmitter connected to the bus.

At a given arbiter, the arbitration between transmitters occurs based on transitions of the TxID value. Each arbiter on the data bus receives data from one or more transmitters and (potentially) from a previous arbiter on the bus. The arbiter selects the first transmitter or arbiter that has a valid data as the active agent. When the current transmitter/arbiter toggles its TxID, the arbiter switches to the next transmitter/arbiter in line that has valid data. If none of the other transmitters/arbiters have valid data, the arbiter may be configured to continue to TxID pointing to the current transmitter even where its TxID is toggling.

Embodiments provide for less complex and greater fairness than, e.g., credit-based or fixed allocation arbitration techniques. While fixed slot methods can be simple and enable balanced arbitration, bus utilization can be very low as bubbles are introduced. In a round robin approach, valid bits are sent to a central controller, which introduces timing restrictions and/or circuit speed paths. And credit-based methods are complex, and typically require large logic blocks, and additional wires, etc.

Embodiments, in contrast, provide a simple implementation having logic that occupies a small area and uses a single wire on the bus direction. Using arbitration as described herein, 100% bus utilization is realized, while assuring 100% balanced arbitration. Furthermore, embodiments enable addition of arbiters in a plug and play method with no changes in other arbiters. There is no limitation on the number of arbiters, and adding a new arbiter does not require any additional logic.

Referring now to FIG. 1, shown is a block diagram of a portion of an arbitration system in accordance with an embodiment of the present invention. More specifically, FIG. 1 shows at least a portion of distributed arbitration system 100. In this distributed arbitration system, multiple arbiters are present and coupled together, e.g., serially, to enable incoming data from a variety of different sources (e.g., multiple transmitters or other information sources and downstream arbiters) to send information upstream to a destination. In an embodiment, this destination may be an aggregation or other buffer (not shown for ease of illustration in FIG. 1), from which the data may be provided to one or more destinations. Note that embodiments may be also used in systems in which multiple transmitters send messages to different destinations.

In the embodiment shown in FIG. 1, arbitration system 100 includes a plurality of serially-connected arbiters $110_0$-$110_2$. Understand that while three arbiters are shown for purposes of illustration, the scope of the present invention is not limited in this regard and many more serially-connected arbiters may be present in particular embodiments. As further illustrated, each arbiter 110 couples to one or more transmitters $120_0$-$120_2$. Similarly, while four transmitters are shown, many more transmitters may be present in particular embodiments. Note that arbiter $110_1$ is coupled to multiple transmitters $120_1$ and $120_2$, as well as further receiving an input from downstream arbiter $110_2$. In the arrangement shown in FIG. 1, arbiter $110_0$ is a most upstream arbiter, and which may be configured to directly connect to a destination, such as a buffer. In turn, arbiter $110_2$ is a most downstream arbiter, while arbiter $110_1$ couples between these other two arbiters. As examples, transmitters 120 may correspond to given intellectual property (IP) blocks of the processor or SoC. In certain embodiments, some transmitters 120 may be cores (e.g., homogeneous or heterogeneous cores). In turn, other transmitters 120 may correspond to one or more graphics engines. Still further, additional transmitters 120 may correspond to other IP blocks of a SoC, such as specialized media processors, image processors or so forth.

In any event, each arbiter 110 is configured to receive incoming information such as in the form of data packets from one or more sources. In addition to receipt of data, arbiters 110 further receive a TxID associated with the data that each transmitter 120 is configured to send with a packet (or portion thereof). As described herein, embodiments may perform arbitration in the various arbiters 110 based at least in part on the TxIDs, and more specifically based at least in part on state transitions in the TxIDs.

For purposes of illustration, arbiters 110 are shown to include internal selection logic 115, which in an embodiment may be implemented at least in part using a multiplexer. Of course, understand that arbiters 110 further include additional arbitration logic, which may be implemented as a combination of hardware, software and/or firmware to perform the TxID-based arbitration described herein. In the arrangement of FIG. 1, note that the most downstream arbiter $110_2$ may not receive a valid input to the second input of selection logic $115_2$ (identified as a data bus), in some cases. As such, selection logic $115_2$ may be configured to always select data presented by transmitter $120_3$, so long as such data is incoming.

Distributed arbitration system 100 may be used to arbitrate access to an interconnect 130. In embodiments, interconnect 130 may be any type of interconnect such as a data bus or so forth to which multiple agents (such as the transmitters shown in FIG. 1) are coupled. While in the embodiment of FIG. 1 the TxID information is communicated via a separate interconnect (which may be a single wire), understand the scope of the present invention is not limited in this regard. For example, in other embodiments the TxID information may be encoded in one or more bits of interconnect 130 (and may be communicated as one or more bits appended to the data packets sent by transmitters 120). Understand while shown at this high level in the embodiment of FIG. 1, many variations and alternatives are possible.

Figure 2:
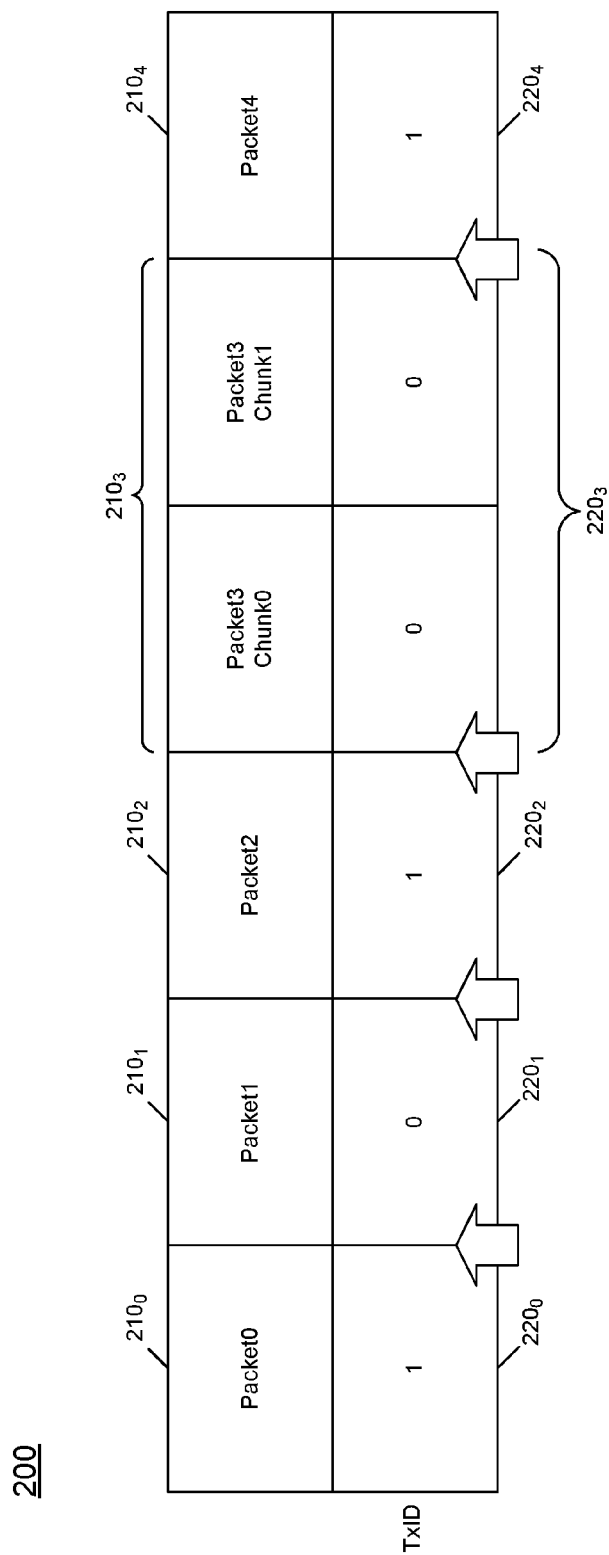
FIG. 2 is an illustration of a plurality of data communications in accordance with an embodiment of the present invention.

As discussed above, each transmitter (and arbiter) communicates data packets or other data chunks in association with a corresponding TxID. It is these TxIDs that the arbiters of the distributed arbitration system use to indicate where a given arbiter is to switch to another information source. Referring now to FIG. 2, shown is an illustration of a plurality of data communications from a given source with associated TxIDs. As illustrated in FIG. 2, a data stream 200 is formed of a plurality of packets $210_0$-$210_4$. Note that the packets may be communicated with variable size. As such, packets $210_0$-$210_2$ and $210_4$ are single-wide packets that can be communicated in a single clock cycle. In turn, packet $210_3$ is a double-wide packet that requires two cycles to communicate. For example, in an embodiment single-wide packets may be 64 bits, 128 bits or some other bit width, while in turn a double-width packet may be 128 bits, 256 bits or some other bit width. In any case, an information source that sends packets 210 associates given TxIDs $220_0$-$220_4$ with these packets. Note that transitions in the TxID values occur for each individual packet as illustrated with arrows in FIG. 2 to indicate to an arbiter where to switch the arbitration to the next transmitter. Each transmitter may toggle this TxID on every new packet. The TxID bit is used to indicate data transitions and as an arbitration point in an arbiter.

Note that in case a higher priority is needed during a specific period of time or there is a requirement to ensure that two or more packets reach the destination together (with no other packets in the middle), a transmitter can mark two or more packets with the same TxID value. Thus such commonly marked packets may be communicated together all the way to a destination. Note that while embodiments are described herein with regard to packet-based data communications, understand the scope of the present invention is not limited in this regard, and the TxID-based arbitration described herein applies equally regardless of the manner in which data is sent, so long as a transmitter is configured to toggle TxID in association with different data chunks.

Figure 3:
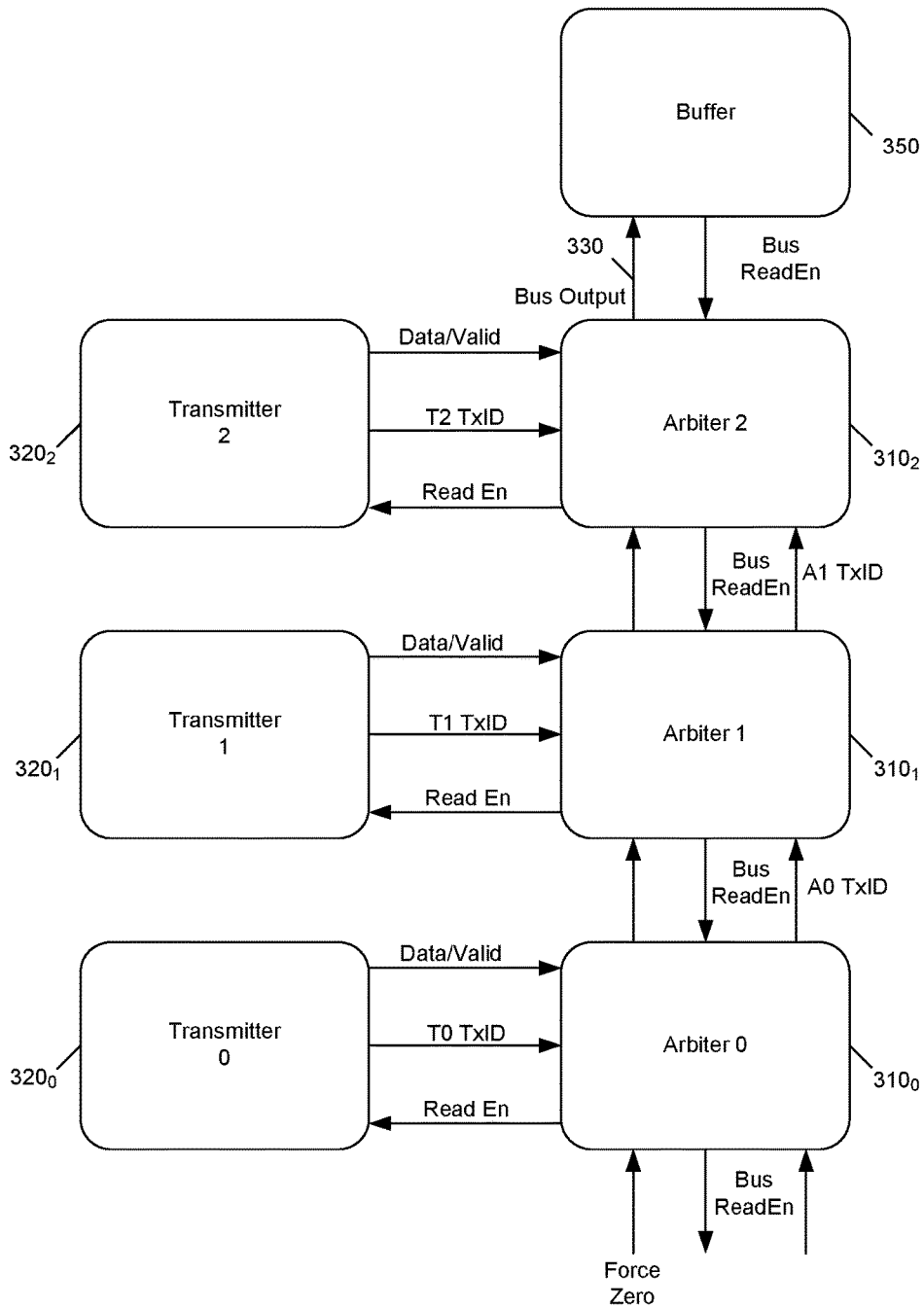
FIG. 3 is a block diagram of an illustration of a distributed arbitration system in accordance with another embodiment of the present invention.

Referring now to FIG. 3, shown is a block diagram of an illustration of a distributed arbitration system in accordance with another embodiment of the present invention. As shown in FIG. 3, arbiter system 300 includes multiple serially-connected arbiters $310_0$-$310_2$. Note further that upstream arbiter $310_2$ is coupled to another entity 350. In different embodiments, entity 350 may be a storage buffer such as an aggregation or output buffer. In other cases, entity 350 may be another, e.g., most upstream arbiter.

As further illustrated, a plurality of transmitters $320_0$-$320_2$ also are present. As with the previous discussion of FIG. 1, arbitration system 300 is to perform arbitration for an interconnect 330. Note that the arbitration ordering has no meaning, so long as it is kept consistently. For example in FIG. 3, arbiter $310_1$ can arbitrate between sources as follows: transmitter $320_1$, previous arbiter $310_0$ and back to transmitter $320_0$. Starting the arbitration with arbiter $310_0$ provides the same fairness results. In this embodiment, in addition to communication of data and associated TxIDs, each transmitter 320 may further be configured to send a valid indicator along with the data. In addition, each arbiter 310 provides a control signal, referred to herein as a read enable signal (ReadEn), to the corresponding transmitter 320. In an embodiment, this read enable signal provides an indication to control the corresponding transmitter 320 to prevent data communication when an input buffer within the corresponding arbiter 310 is full, such that no data is lost. Accordingly, transmitters 320 may be configured to communicate data with corresponding valid indicators and TxIDs, so long as an active ReadEn signal is not present. Instead with an active ReadEn signal, the corresponding transmitter 320 may be prevented from communicating further data into the associated arbiter 310.

As further illustrated, similar ReadEn or buffer full signals may be sent downstream throughout the distributed arbiters for the same purposes. In other manners, distributed arbitration system 300 may generally operate as described above with regard to arbitration system 100 of FIG. 1. Understand while shown at this high level in the embodiment of FIG. 3, many variations and alternatives are possible.

Figure 4:
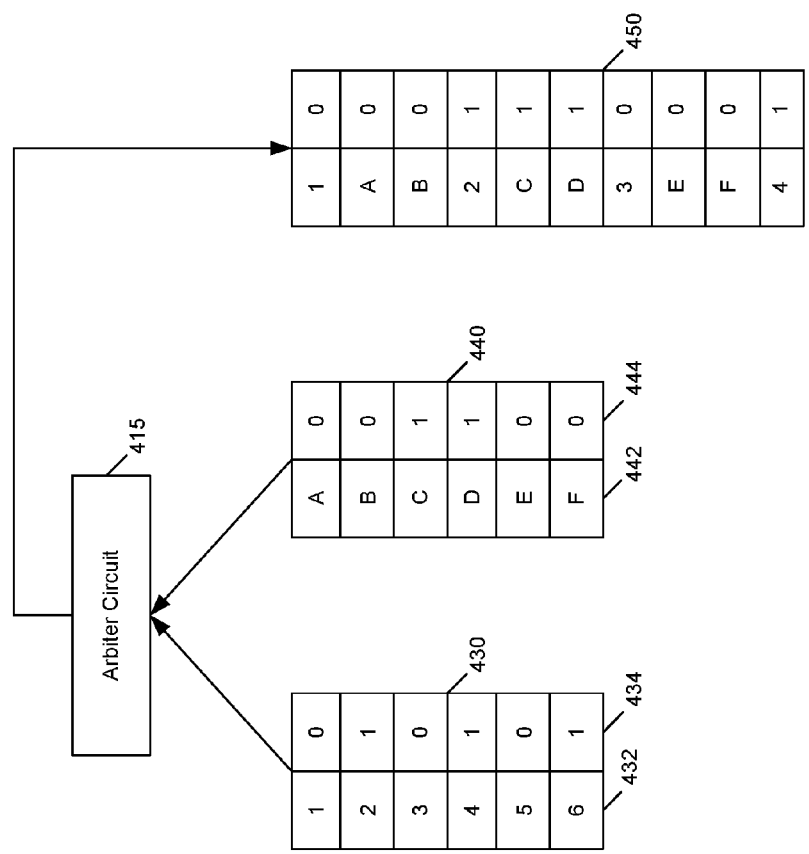
FIG. 4 is a block diagram illustrating operation of an arbiter in accordance with an embodiment.

Referring now to FIG. 4, shown is a block diagram illustrating operation of an arbiter in accordance with an embodiment. As shown in FIG. 4, arbiter 400 includes an arbitration circuit 415, a first queue or buffer 430 and a second queue or buffer 440. In various embodiments, first queue 430 may correspond to an input queue, which is configured to receive incoming data, e.g., in the form of packets received from one or more transmitters coupled to arbiter 415. In turn, second queue 440 may be configured as a ring or forwarding buffer to store incoming data, e.g., in the form of packets received from a downstream arbiter.

As illustrated, both queues 430 and 440 couple to arbitration circuit 415. In an embodiment, arbitration circuit 415 may include a multiplexer and control logic configured to receive information from queues 430 and 440 and select a given entry from one of the cores for output to a destination. As further illustrated in FIG. 4, a destination storage 450 is present. Understand that in many embodiments, destination storage 450 may be external to arbiter 400 of a given distributed arbitration system. For example, destination buffer 450 may correspond to a forwarding buffer of an upstream arbiter. Or it may be a destination buffer, such as an aggregator or output buffer.

FIG. 4 further details operation of arbiter 400. More specifically, each of queues 430 and 440 is illustrated with a plurality of entries. For ease of discussion, each entry, which stores data and associated information, e.g., of a given packet, includes a first field to store a packet identifier (packet ID) (in the left hand column of queues 430 and 440 (enumerated as columns 432 and 442)). In addition, each entry further includes a second field to store an associated TxID (in columns 434 and 444). Of course additional information including associated data and other information may be stored in the entries. Based at least in part on the corresponding TxIDs, arbitration circuit 415 is configured to select appropriate packets for output to destination buffer 450. And in doing so, arbiter 400 operates in a fully balanced manner in which fairness results and no packet or source is starved.

In an embodiment, queues 430 and 440 may be implemented as first-in first-out (FIFO) buffers. As such, data packets may be filled into entries of buffers 430 and 440 beginning at the top of these queues (e.g., transactions 1 and A are the respective first packets stored into these queues). Note with regard to the entries in first queue 430, each packet identifier is associated with a TxID in an alternating fashion (namely the 010101 order in FIG. 4). Instead in second queue 440, the entries are stored with multiple packets in a row associated with the same TxID (namely the 001100 order in FIG. 4). This may be the case since as discussed above second queue 440 is a forwarding buffer, such that the entries therein have already gone through at least one stage of arbitration prior to being placed into queue 440.

Arbitration circuit 415 may operate by first selecting an entry from first queue 430 (namely the first entry having a packet ID of 1 and a TxID of 0). Of course in other examples, an entry from second queue 440 may be the first to be selected. As illustrated, the first entry in destination buffer 450 is this first selected packet. Thereafter, arbitration circuit 415 proceeds to select two packets from second queue 440, owing to the common TxID (namely packets A and B, both having TxIDs of 0). Then on the change in state of the TxID in the next entry of second queue 440, arbitration circuit 415 next selects packet 2 from queue 430 (having a TxID of 1). And because the next packet in first queue 430 (namely packet 3 having a TxID of 0) has a state transition in its TxID, the next selected packet is packet C from second queue 440.

Similar operations occur to provide data in an arbitrated manner between both queues 430 and 440 to destination buffer 450. With the implementation shown in FIG. 4, arbiter circuit 415 may use this TxID to arbitrate data between its directly-coupled transmitter(s) and downstream data, by switching between data of the two queues. In the arbitration performed in arbiter circuit 415, one slot out of three slots is provided from queue 430 and two slots are provided from queue 440, resulting in a balanced arbitration without knowing a priori that there may be transmitters connected on the bus before queue 440 (e.g., receiving its input from a downstream arbiter). Thus an arbiter does not need to know the number of active transmitters in order to correctly set fairness. In case a transmitter that feeds data to queue 430 does not have a valid data and queue 430 becomes empty, packets are sent from queue 440 without losing slots, resulting in 100% bandwidth utilization. Embodiments thus provide a simple and clean arbitration solution with perfect performance using simple logic. Of course understand while shown with these example packets and TxIDs for purposes of discussion and representation, many variations and other possible arbitration results may occur in other embodiments.

Figure 5:
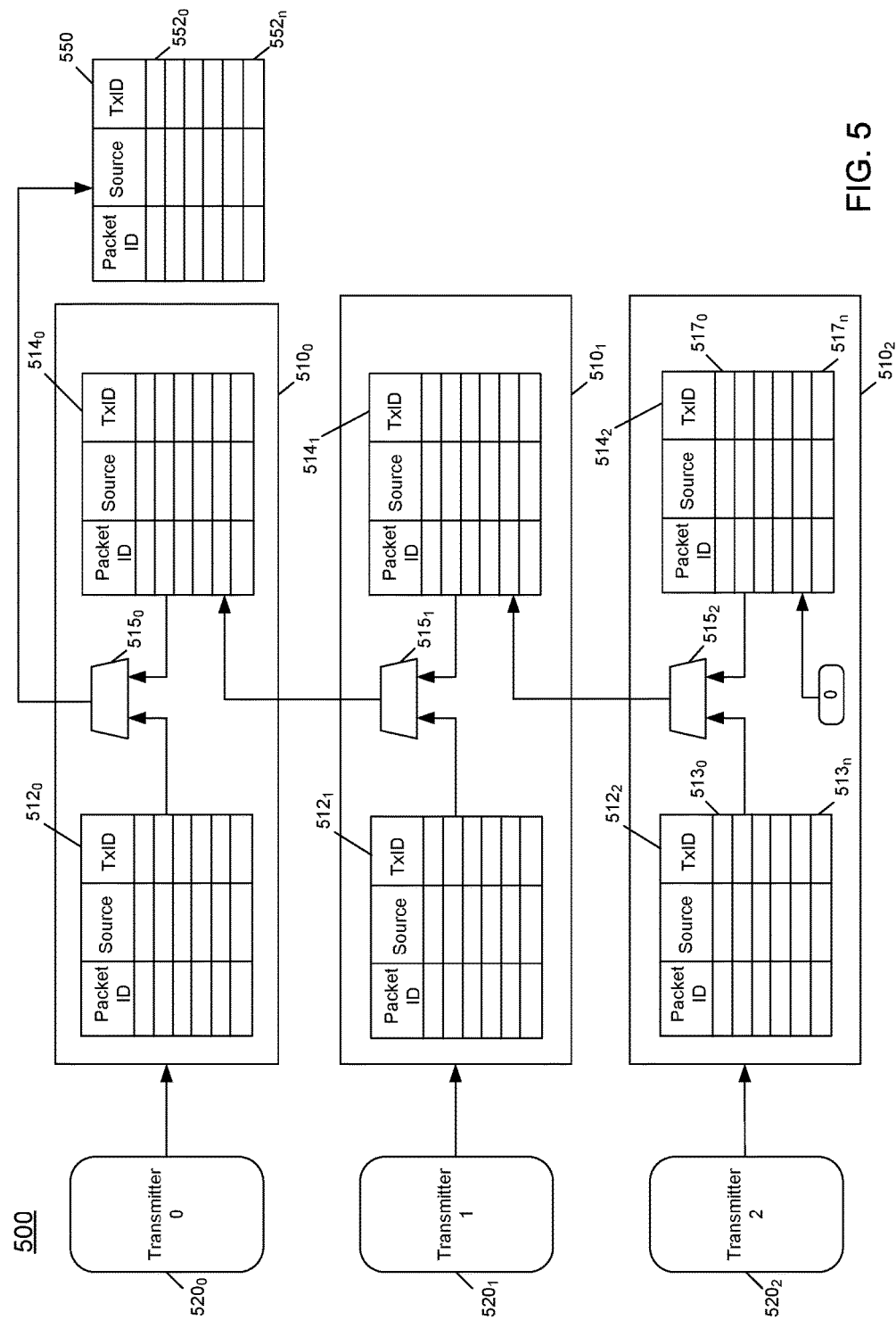
FIG. 5 is a block diagram of a distributed arbitration system in accordance with another embodiment of the present invention.

Referring now to FIG. 5, shown is a block diagram of a distributed arbitration system in accordance with another embodiment of the present invention. As shown in FIG. 5, distributed arbitration system 500 includes a plurality of serially-connected arbiters $510_0$-$510_2$. Each arbiter 510 is coupled to a corresponding one of a plurality of transmitters $520_0$-$520_2$. Although the scope of the present invention is not limited in this regard, in an embodiment transmitters $520_0$ and $520_1$ may be cores of a processor or other SoC (e.g., in-order cores, out-of-order cores, or a combination thereof). Also in this embodiment, transmitter $520_2$ may be a graphics engine. In some embodiments, such as where one or more of these transmitters is configured to operate at independent frequencies, the transmitters may couple to the corresponding arbiters 510 via an intervening clock crossing circuit, such as a bubble generator first-in first-out buffer (BGF) or other FIFO or other clock crossing mechanism. As further illustrated in FIG. 5, arbiter $510_0$, corresponding to a most upstream arbiter, couples to a destination queue 550, which may be implemented as an aggregator queue to store incoming packets and corresponding information in a plurality of entries $552_0$-$552_n$. From there, the packets may be routed to one or more destinations.

Still with reference to FIG. 5, note that each arbiter 510 includes a plurality of queues. Specifically, each arbiter 510 includes a first queue $512_0$-$512_2$, referred to herein also as a slice queue, as this is the queue dedicated for receipt of incoming packets from the corresponding transmitters. In addition, each arbiter 510 further includes a second queue $514_0$-$514_2$, referred to herein as a ring queue or forwarding queue, as this queue is associated with an interconnect and interaction with downstream arbiters.

As further illustrated, each arbiter 510 includes an arbitration circuit $515_0$-$515_2$, represented schematically as a multiplexer. Note that the output of each arbitration circuit 515 is in turn coupled to the corresponding second queue 514 of the next higher arbiter. And arbiter circuit $515_0$ provides its output to aggregator queue 550. In turn, there are no valid inputs provided to ring queue $514_2$, as control is fixed to populate this queue with zero values, since in this particular configuration, there is no further downstream arbiter. Of course while shown at this high level in the embodiment of FIG. 5, many variations and alternatives are possible.

Figure 6:
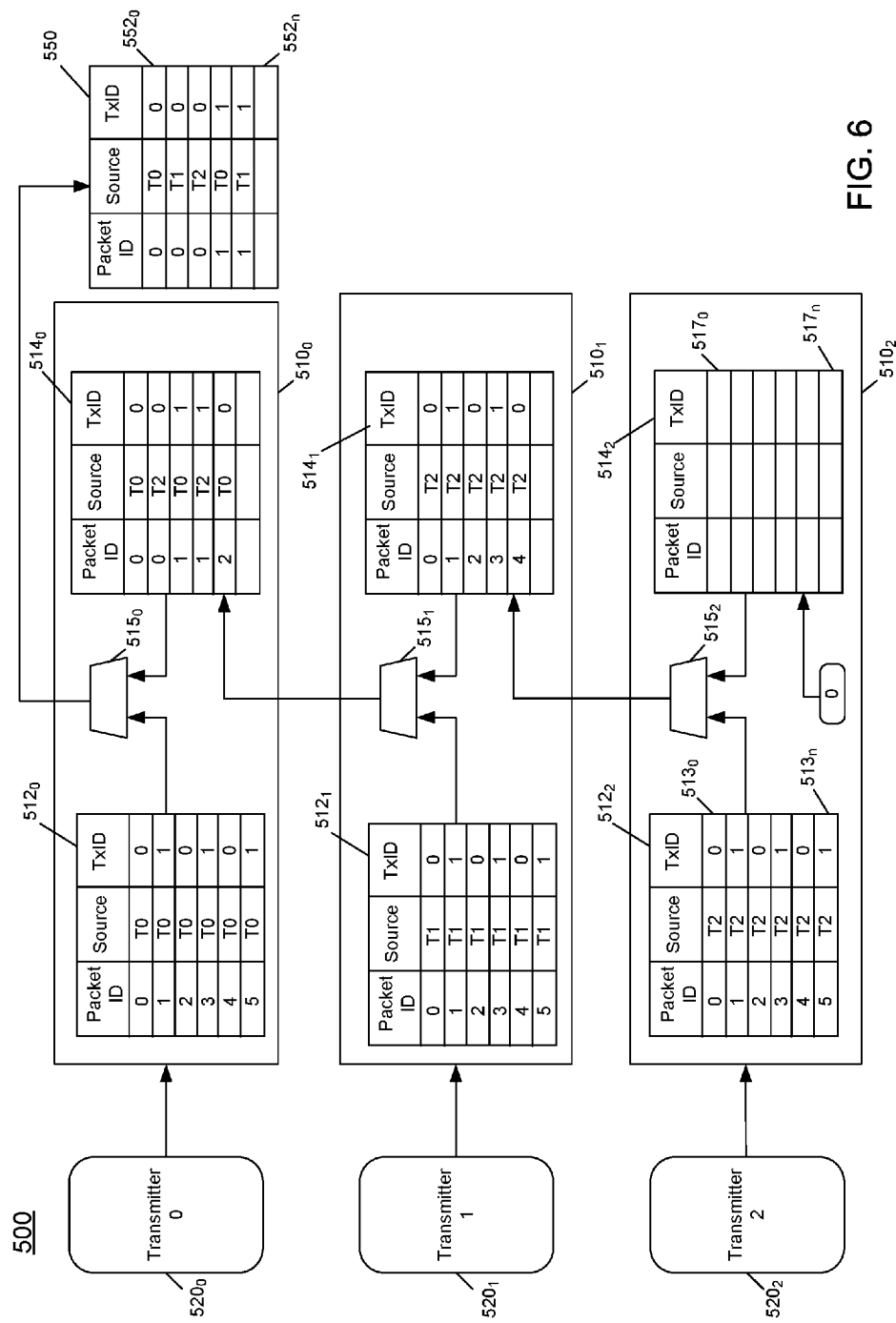
FIG. 6 is an illustration of operation of the distributed arbitration system in accordance with the other embodiment of present invention.

FIG. 6 illustrates operation of the distributed arbitration circuit of FIG. 5, with entries being filled with incoming packets and arbitrations performed to enable the packets to proceed in a fully balanced and fair manner through the distributed arbitration system to end up in aggregator queue 550. More specifically, FIG. 6 illustrates details of operation after a number of arbitration cycles, such that valid data from each of transmitters $520_0$-$520_2$ has arrived in aggregator queue 550. As seen, full balance and fairness is realized by leveraging use of transitions in the TxIDs to ensure that fair amounts of packets from each of the sources are communicated through distributed arbitration system 500. Note with regard to FIG. 6 that all entries in ring queue $514_1$ are from transmitter $520_2$ (via slice queue $512_2$), as there are no packets provided by way of ring queue $514_2$. Note also that each of the slice queues 512 is configured to receive and store packets only from its corresponding transmitter 520. Note if multiple transmitters were coupled to a given arbiter 510, then there would be a given slice queue for each transmitter. And the arbiter would be configured to serve these more than two queues in the same manner that it handles arbitration between the slice and ring queues (namely it switches to the next queue when TxID is toggled within one of the queues).

Figure 7:
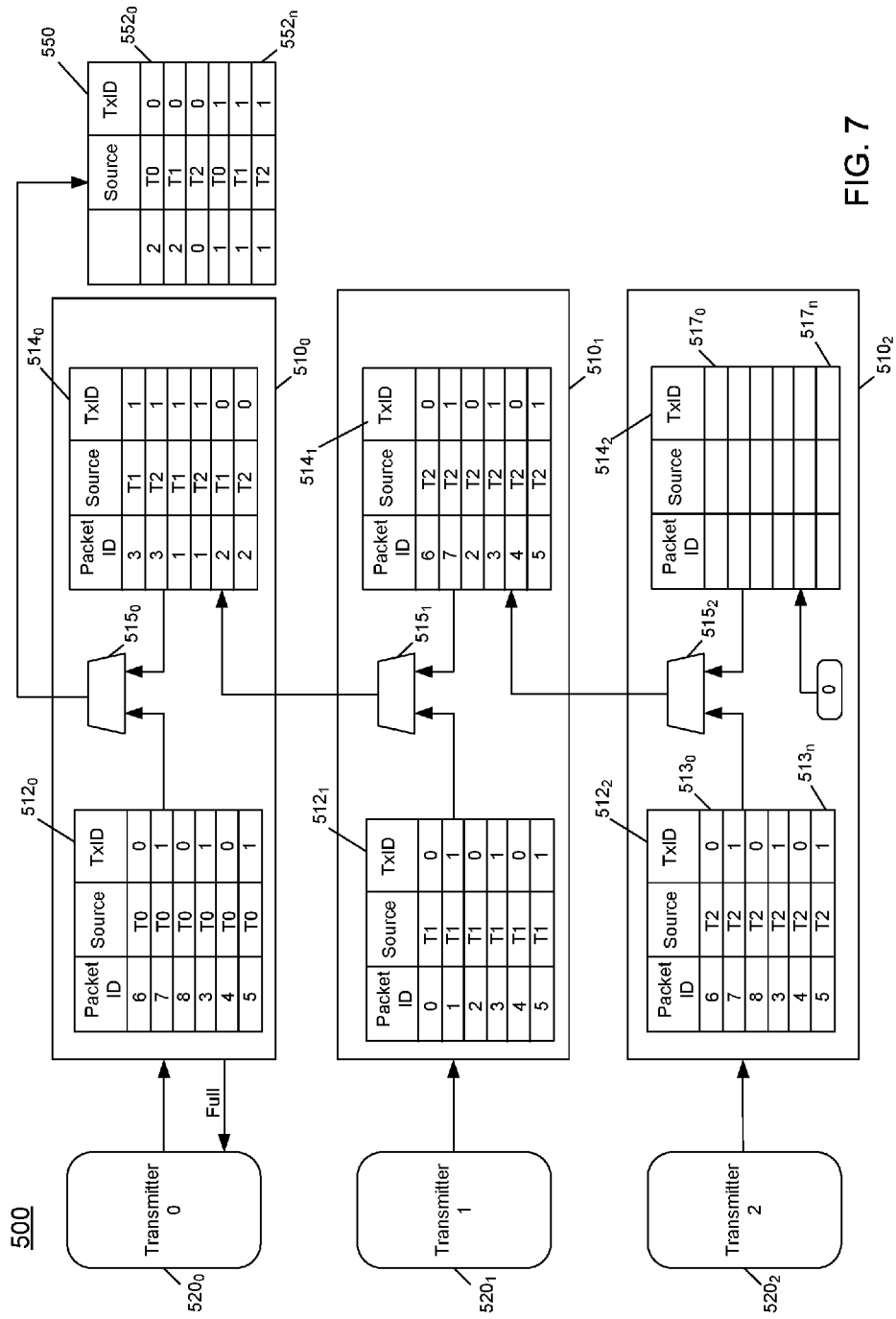
FIG. 7 is an illustration of operation of the distributed arbitration system in accordance with the other embodiment of present invention.

Finally, note that ring queue $514_0$ stores packets from transmitters $520_1$ and $520_2$, and corresponding arbitration circuit $515_0$ performs arbitration between these packets and corresponding packets stored in slice queue $512_0$. Note that at the output of arbiter $510_1$, the TxID bit is toggling every two packets (one for arbiter $510_2$ and one for transmitter $520_1$). As seen in FIG. 7, the output of arbiter $510_0$ is 100% balanced.

FIG. 7 illustrates further arbitration operations in a distributed arbitration system as described herein. Note that FIG. 7 shows that when corresponding packets have successfully been provided out of a corresponding slice queue (either to an upstream ring queue or to the aggregator queue), the corresponding entries in the slice queue may be written over with new packet information. And when no available storage exists in a given slice queue (in that no stored packet information has been provided to another queue), a full signal is issued, as illustrated in FIG. 7 (namely the full signal sent from arbiter $510_0$ to transmitter $520_0$). Responsive to receipt of this full signal, transmitter $520_0$ will not send any further packets into arbiter $510_0$ until this signal is de-asserted. Understand while shown with these representative states in FIGS. 6 and 7, many additional arbitration operations between these states may occur.

Figure 8:
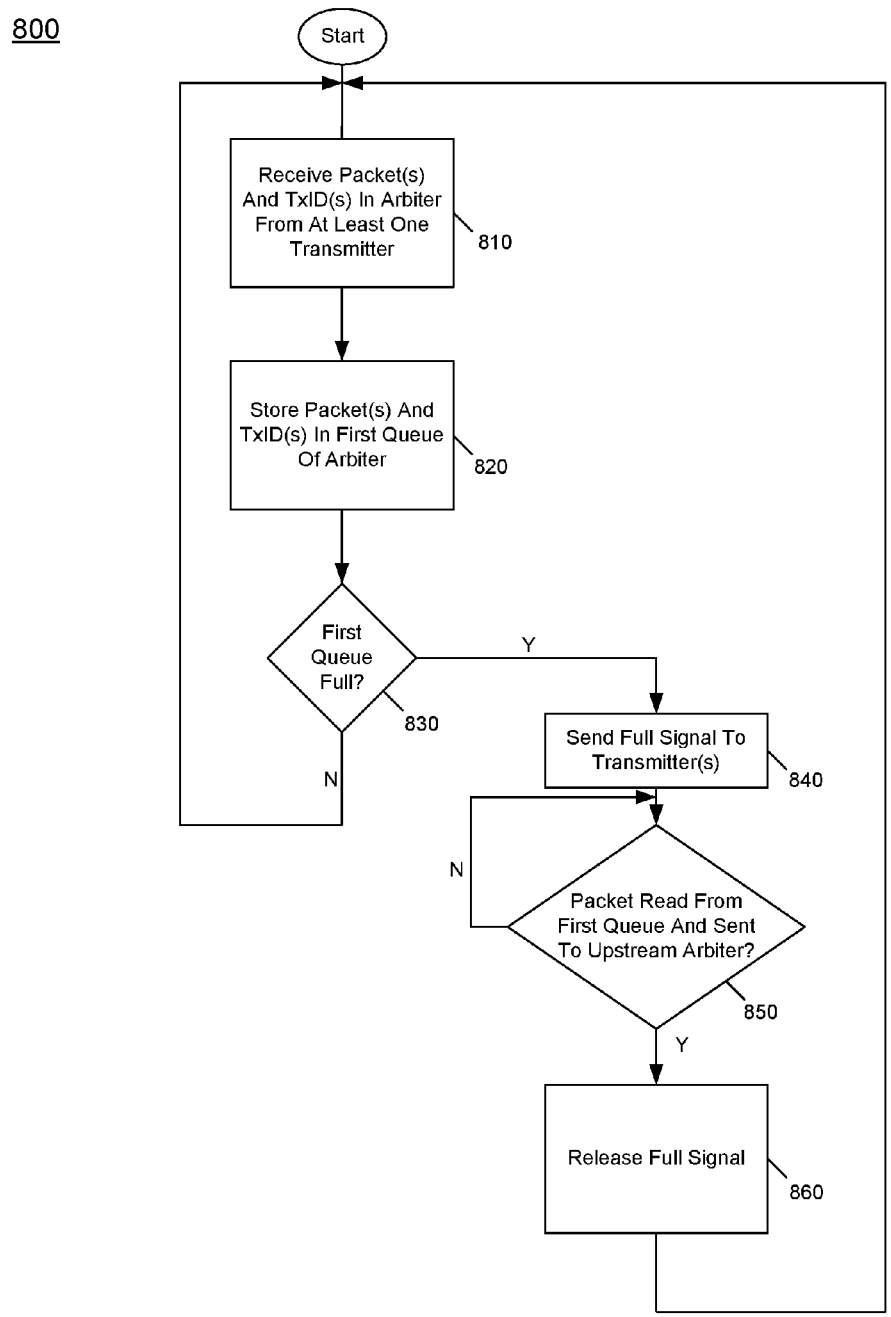
FIG. 8 is a flow diagram of a method in accordance with an embodiment of the present invention.

Referring now to FIG. 8, shown is a flow diagram of a method in accordance with an embodiment of the present invention. More specifically, method 800 of FIG. 8 may be performed by arbitration logic of a given arbiter of the distributed arbitration system. As such, method 800 may be performed by hardware, software, and/or firmware or combinations thereof. More specifically, method 800 of FIG. 8 details a method for controlling a first (or slice) queue of the arbiter. As illustrated, method 800 begins by receiving one or more packets and corresponding TxIDs in the arbiter from at least one transmitter (block 810). As described above, in some embodiments such packets may include various information including, for example, a packet identifier, data and a TxID, which may toggle for each packet. Control next passes to block 820 where the packet and corresponding TxID can be stored in an entry of the first queue. In embodiments, the first queue may be implemented as a FIFO, such that this packet is stored in the first available entry. Of course understand that additional information may be stored in the entry. Next it is determined at diamond 830 whether the first queue is full. This determination may be based on whether there are any available entries (either empty entries or entries that may be written over as their contents have already been selected and output from the arbiter, as indicated, e.g., by a read pointer of the queue, valid indicators or so forth). If the first queue is not full, control passes back to block 810 for further receipt and handling operations.

Instead if it is determined at diamond 830 that the first queue is full, control passes to block 840 where a full signal, e.g., in the form of a ReadEn signal, may be sent to the coupled transmitters to prevent them from sending any further packets into the arbiter until this signal is de-asserted. Thus operation next proceeds to diamond 850 to determine whether at least one packet has been read from the first queue and sent, e.g., to an upstream arbiter. This determination may be based, e.g., on movement of a read pointer. If so, this means that at least one available entry is now present in the first queue. As such, control passes to block 860 where this full signal may be released, e.g., de-asserted, such that the one or more transmitters can again send information into the arbiter. Understand while shown at this high level in the embodiment of FIG. 8, many variations and alternatives are possible.

Note that method 800 is shown in the specific embodiment of an arbiter that couples between downstream and upstream arbiters. Understand that the method generally applies equally to other arbiters, although certain variations are possible. For example, a most upstream arbiter does not send outputs to another arbiter. Similarly, a most downstream arbiter does not receive inputs from another arbiter.

Figure 9:
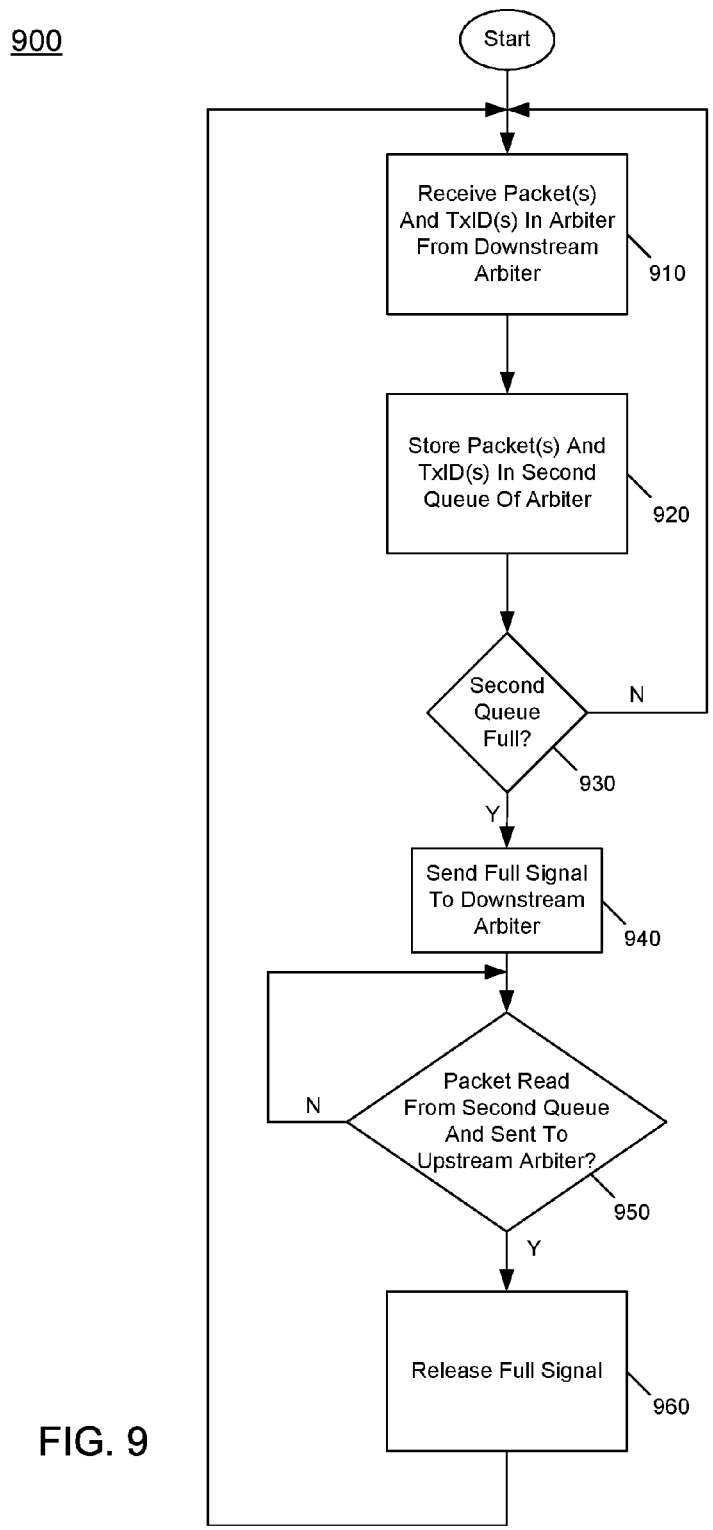
FIG. 9 is a flow diagram of a method in accordance with another embodiment of the present invention

Referring now to FIG. 9, shown is a flow diagram of a method in accordance with another embodiment of the present invention. More specifically, method 900 of FIG. 9 may be performed by arbitration logic of a given arbiter (e.g., additional arbitration logic as that used for performing method 800) of the distributed arbitration system. Method 900 details a method for controlling a second (or forwarding) queue of the arbiter. As illustrated, method 900 begins by receiving one or more packets and corresponding TxIDs in the arbiter from a downstream arbiter (block 910). As such, these packets have already proceeded through at least one level of arbitration in this downstream arbiter. Control next passes to block 920 where the packet and corresponding TxID can be stored in an entry of a second queue, e.g., a separate FIFO. Next it is determined at diamond 930 whether the second queue is full, e.g., based on whether there are any available entries. If not, control passes back to block 910 for further receipt and handling operations.

Instead if it is determined at diamond 930 that the first queue is full, control passes to block 940 where a full signal, e.g., in the form of a ReadEn signal, may be sent to the downstream arbiter to prevent it from sending any further packets into the arbiter until this signal is de-asserted. Thus operation next proceeds to diamond 950 to determine whether at least one packet has been read from the second queue and sent, e.g., to an upstream arbiter. If so, control passes to block 960 where this full signal may be released such that the downstream arbiter can again send information into the arbiter. Understand while shown at this high level in the embodiment of FIG. 9, many variations and alternatives are possible.

Figure 10:
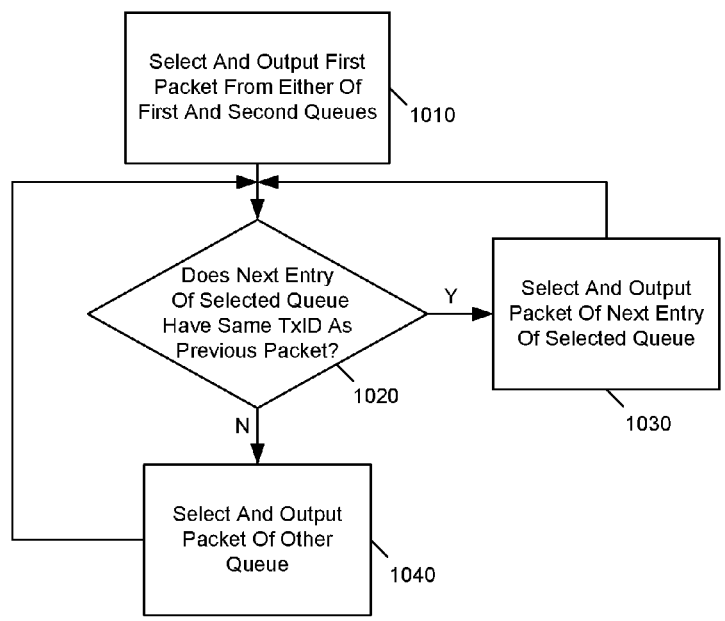
FIG. 10 is a flow diagram of a method in accordance with another embodiment of the present invention.

Referring now to FIG. 10, shown is a flow diagram of a method in accordance with another embodiment of the present invention. As shown in FIG. 10, method 1000 may be performed by arbitration logic of an arbiter, such as the same arbitration logic and arbiter with regard to the methods of FIGS. 8 and 9. As illustrated, method 1000 begins at block 1010 by selecting and outputting a first packet from a given one of the two queues. Understand that for a first packet to be sent (e.g., present in a first entry of one of the queues) it does not matter which packet is selected and fair arbitration proceeds in either case. Note that in connection with selecting and outputting this first packet, a read pointer of the selected queue can be updated to point to the next entry in the queue.

Still referring to FIG. 10, control next passes to diamond 1020 to determine whether this next entry of the selected queue has the same TxID as the previous packet. If this is the case, indicating that both entries are of the same packet (e.g., multiple portions of a large packet) or according to particular priority rules in which a given transmitter is afforded a higher priority or bandwidth, control passes to block 1030. Note that multiple entries having the same TxID may also indicate that these entries were due to a prior downstream arbitration. At block 1030 this next entry can be selected and output (where this next entry stores a packet with a corresponding TxID that is the same as the prior packet). Control next loops back to diamond 1020.

Otherwise, if it is determined that the next entry of the selected queue does not have the same TxID value as the previous packet, control instead passes to block 1040. At block 1040 a packet of the other queue can be selected and output (e.g., a top packet of this queue). Note that this packet may have the same TxID value as the previous packet or it may have a different value. In either case, this is the next packet to be selected out from the other queue. Then control passes back to block 1020 to determine whether the next entry in this other queue has the same TxID value. As such, method 1000 proceeds iteratively for all arbitrations performed in an arbiter to ensure arbitration occurs in a fair and balanced manner. Understand while shown at this high level in the embodiment of FIG. 10, many variations and alternatives are possible. For example, in the case where a given queue is empty, an arbiter may serve a single buffer even though entries have toggling TxIDs. Such situation may occur as shown in arbiter $515_2$ in FIGS. 5-7 (as queue $514_2$ does not store any data) or when a given transmitter stops sending data.

Embodiments can be used in many communication applications and may be applicable for any kind of communication protocol involving more than one transmitter using a single port/bus via a single line arbitration control. Although the scope of the present invention is not limited in this regard, a distributed arbitration system can be implemented in a debug trace fabric, which may couple to a plurality of IP blocks of a processor or other SoC. Similarly, embodiments may be used with other fabrics and interconnects, such as a fabric for closed chassis debug, a high speed trace interface, among others such as on-die and/or inter-die interconnects such as for an on-die logic analyzer.

Figure 11:
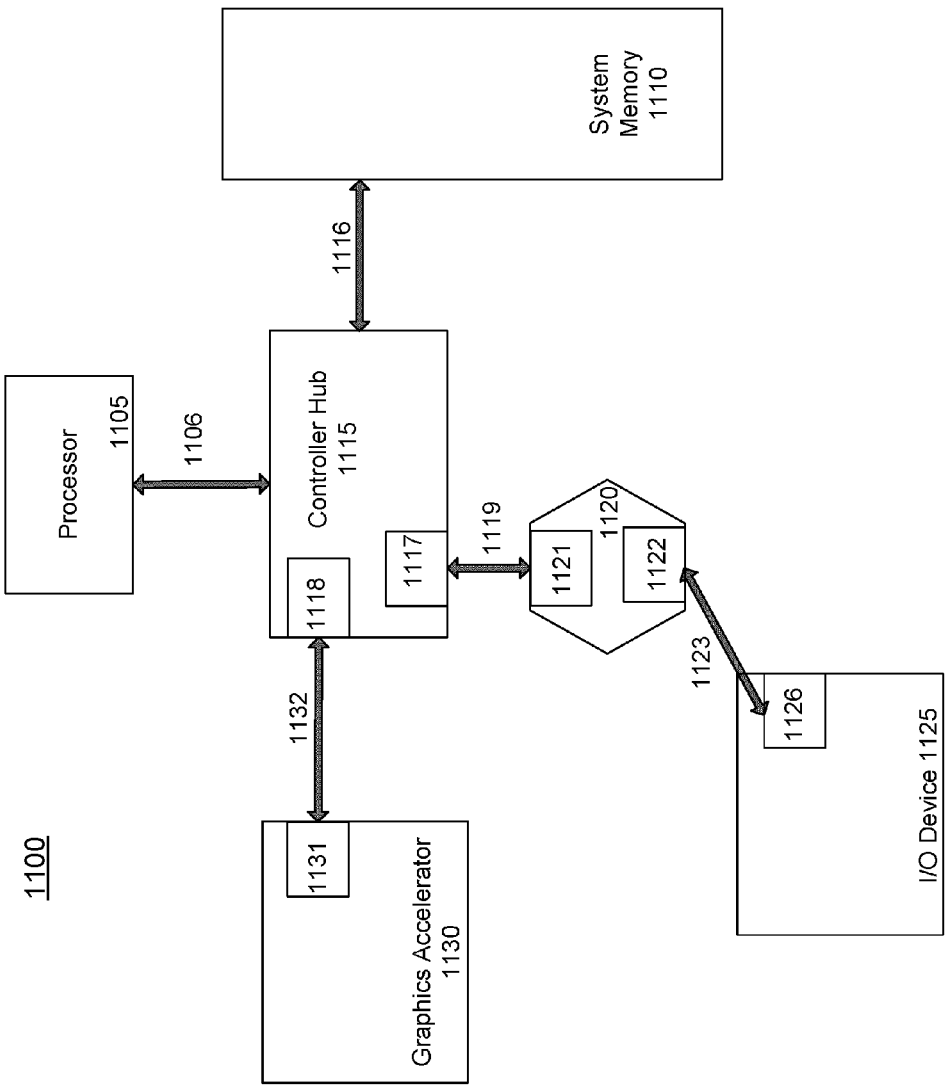
FIG. 11 is an embodiment of a fabric composed of point-to-point links that interconnect a set of components.

Embodiments may be implemented in a wide variety of interconnect structures. Referring to FIG. 11, an embodiment of a fabric composed of point-to-point links that interconnect a set of components is illustrated. System 1100 includes processor 1105 and system memory 1110 coupled to controller hub 1115. Processor 1105 includes any processing element, such as a microprocessor, a host processor, an embedded processor, a co-processor, or other processor. Processor 1105 is coupled to controller hub 1115 through front-side bus (FSB) 1106. In one embodiment, FSB 1106 is a serial point-to-point interconnect. In another embodiment, link 1106 includes a parallel serial, differential interconnect architecture that is compliant with different interconnect standards, and may include a distributed arbitration system as described herein.

System memory 1110 includes any memory device, such as random access memory (RAM), non-volatile (NV) memory, or other memory accessible by devices in system 1100. System memory 1110 is coupled to controller hub 1115 through memory interface 1116. Examples of a memory interface include a double-data rate (DDR) memory interface, a dual-channel DDR memory interface, and a dynamic RAM (DRAM) memory interface.

In one embodiment, controller hub 1115 is a root hub, root complex, or root controller in a PCIe interconnection hierarchy. Examples of controller hub 1115 include a chip set, a memory controller hub (MCH), a northbridge, an interconnect controller hub (ICH), a southbridge, and a root controller/hub. Often the term chip set refers to two physically separate controller hubs, i.e., a memory controller hub (MCH) coupled to an interconnect controller hub (ICH). Note that current systems often include the MCH integrated with processor 1105, while controller 1115 is to communicate with I/O devices, in a similar manner as described below. In some embodiments, peer-to-peer routing is optionally supported through root complex 1115.

Here, controller hub 1115 is coupled to switch/bridge 1120 through serial link 1119. Input/output modules 1117 and 1121, which may also be referred to as interfaces/ports 1117 and 1121, include/implement a layered protocol stack to provide communication between controller hub 1115 and switch 1120. In one embodiment, multiple devices are capable of being coupled to switch 1120.

Switch/bridge 1120 routes packets/messages from device 1125 upstream, i.e., up a hierarchy towards a root complex, to controller hub 1115 and downstream, i.e., down a hierarchy away from a root controller, from processor 1105 or system memory 1110 to device 1125. Switch 1120, in one embodiment, is referred to as a logical assembly of multiple virtual PCI-to-PCI bridge devices. Device 1125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an $I^2C$ bus, as an example. Often in the PCIe vernacular, such a device is referred to as an endpoint. Although not specifically shown, device 1125 may include a PCIe to PCI/PCI-X bridge to support legacy or other version PCI devices. Endpoint devices in PCIe are often classified as legacy, PCIe, or root complex integrated endpoints.

Graphics accelerator 1130 is also coupled to controller hub 1115 through serial link 1132. In one embodiment, graphics accelerator 1130 is coupled to an MCH, which is coupled to an ICH. Switch 1120, and accordingly I/O device 1125, is then coupled to the ICH. I/O modules 1131 and 1118 are also to implement a layered protocol stack to communicate between graphics accelerator 1130 and controller hub 1115. A graphics controller or the graphics accelerator 1130 itself may be integrated in processor 1105.

Figure 12:
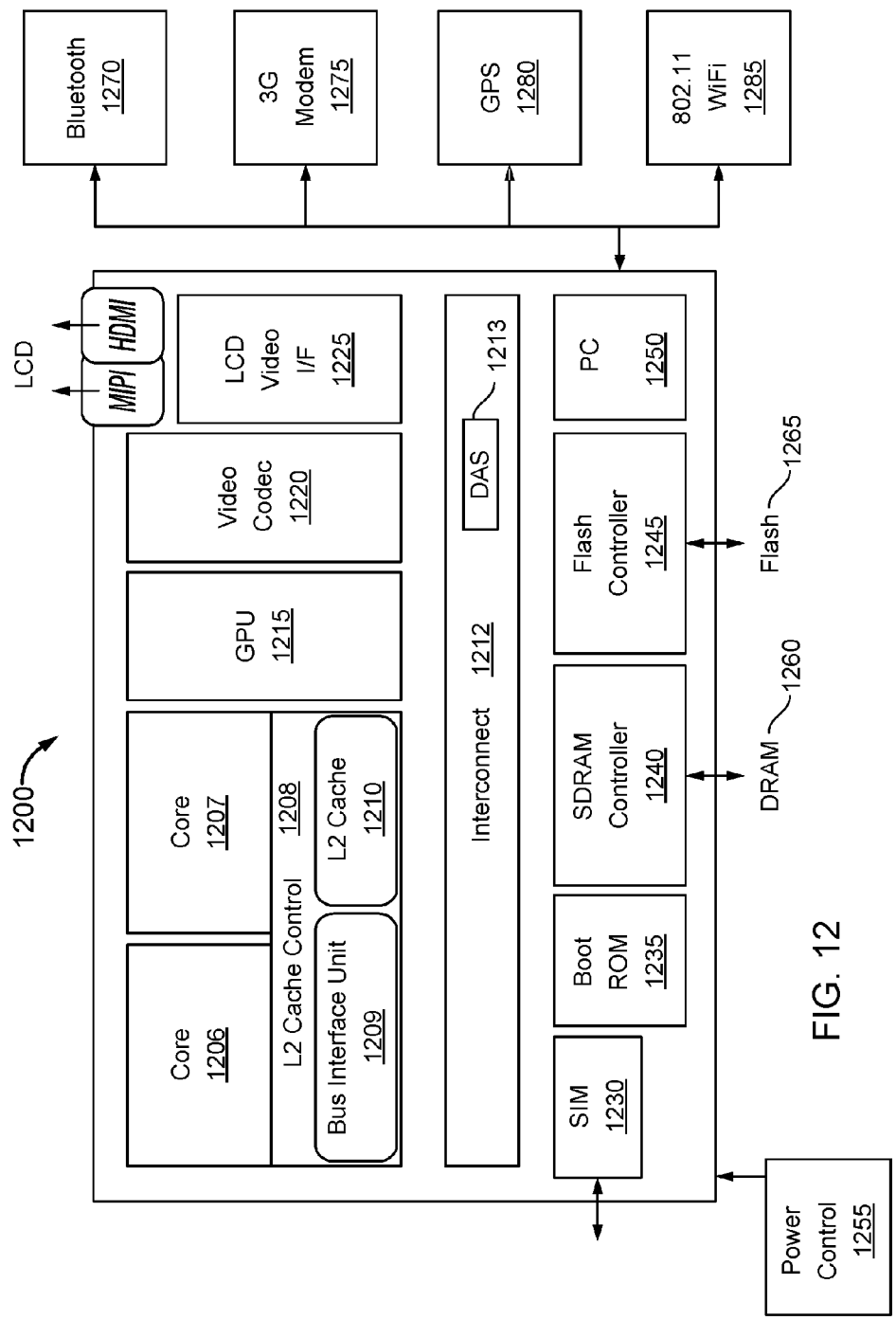
FIG. 12 is an embodiment of a system-on-chip design in accordance with an embodiment.

Turning next to FIG. 12, an embodiment of a SoC design in accordance with an embodiment is depicted. As a specific illustrative example, SoC 1200 may be configured for insertion in any type of computing device, ranging from portable device to server system. Here, SoC 1200 includes 2 cores 1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200 via an interconnect 1212. In embodiments, interconnect 1212 may include a distributed arbitration system 1213, as described herein.

Interconnect 1212 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g., DRAM 1260), a flash controller 1245 to interface with non-volatile memory (e.g., flash 1265), a peripheral controller 1250 (e.g., an eSPI interface) to interface with peripherals, video codecs 1220 and video interface 1225 to display and receive input (e.g., touch enabled input), GPU 1215 to perform graphics related computations, etc. Any of these interconnects/interfaces may incorporate aspects described herein, including distributed arbitration. In addition, the system illustrates peripherals for communication, such as a Bluetooth module 1270, 3G modem 1275, GPS 1280, and WiFi 1285. Also included in the system is a power controller 1255.

Figure 13:
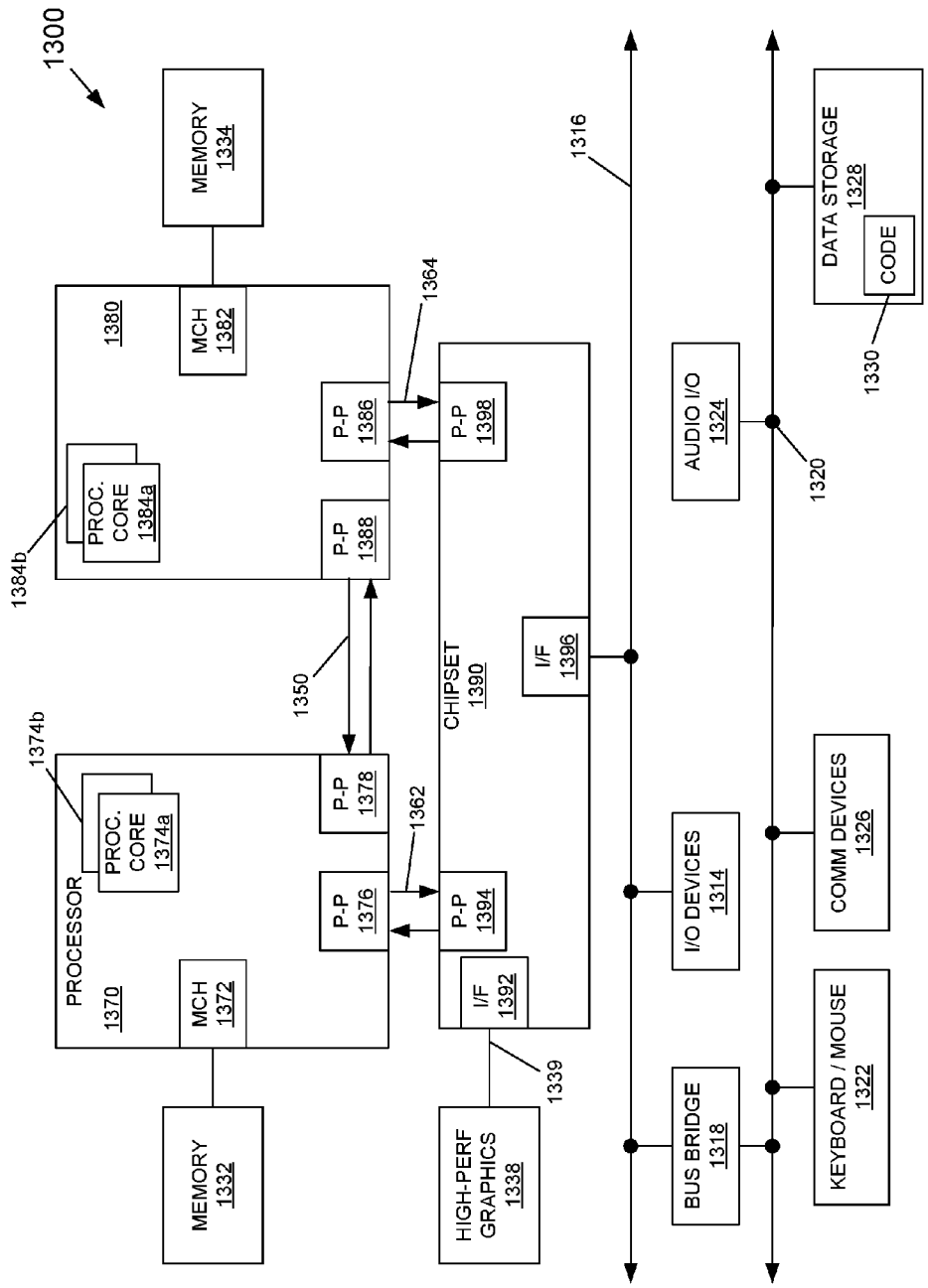
FIG. 13 is a block diagram of a system in accordance with an embodiment of the present invent

Referring now to FIG. 13, shown is a block diagram of a system in accordance with an embodiment of the present invention. As shown in FIG. 13, multiprocessor system 1300 includes a first processor 1370 and a second processor 1380 coupled via a point-to-point interconnect 1350. As shown in FIG. 13, each of processors 1370 and 1380 may be many core processors including representative first and second processor cores (i.e., processor cores 1374*a* and 1374*b* and processor cores 1384*a* and 1384*b*). First and second processors 1370 and 1380 may include one or more distributed arbitration systems as described herein.

Still referring to FIG. 13, first processor 1370 further includes a memory controller hub (MCH) 1372 and point-to-point (P-P) interfaces 1376 and 1378. Similarly, second processor 1380 includes a MCH 1382 and P-P interfaces 1386 and 1388. As shown in FIG. 13, MCH's 1372 and 1382 couple the processors to respective memories, namely a memory 1332 and a memory 1334, which may be portions of system memory (e.g., DRAM) locally attached to the respective processors. First processor 1370 and second processor 1380 may be coupled to a chipset 1390 via P-P interconnects 1362 and 1364, respectively. As shown in FIG. 13, chipset 1390 includes P-P interfaces 1394 and 1398.

Furthermore, chipset 1390 includes an interface 1392 to couple chipset 1390 with a high performance graphics engine 1338, by a P-P interconnect 1339. As shown in FIG. 13, various input/output (I/O) devices 1314 may be coupled to first bus 1316, along with a bus bridge 1318 which couples first bus 1316 to a second bus 1320. Various devices may be coupled to second bus 1320 including, for example, a keyboard/mouse 1322, communication devices 1326 and a data storage unit 1328 such as a disk drive or other mass storage device which may include code 1330, in one embodiment. Further, an audio I/O 1324 may be coupled to second bus 1320.

The following Examples pertain to further embodiments.

In an example, a distributed arbitration system comprises: a first transmitter to output first data and a transmit identifier associated with the first data; and a first arbiter coupled to the first transmitter to receive the first data and to arbitrate between the first data and second data from a second arbiter coupled to the first arbiter, based at least in part on a change in a state of the transmit identifier.

In an example, the first arbiter comprises: a first queue to store the first data; and a second queue to store the second data.

In an example, the first arbiter further comprises a selection logic to select and output a first packet having at least a portion of the first data, based on the change in the state of the transmit identifier associated with the first packet.

In an example, the selection logic is to thereafter select and output a second packet having at least a portion of the second data, based at least in part on a change in a state of a transmit identifier associated with the second packet, where the transmit identifier associated with the first packet and the transmit identifier associated with the second packet are of the same value.

In an example, the second arbiter comprises a downstream arbiter with respect to the first arbiter, and where the second arbiter is to arbitrate between data from another transmitter coupled to the second arbiter and data from another arbiter coupled to the second arbiter, and send the second data to the second queue of the first arbiter.

In an example, the first queue comprises a plurality of entries each having a packet identifier field to store a packet identifier, a data field to store data of a packet, and a transmit identifier field to store a transmit identifier associated with the packet.

In an example, the distributed arbitration system further includes an output buffer coupled to the first arbiter, where the first arbiter is to output selected data to the output buffer for communication to one or more destinations.

In an example, the first arbiter is to arbitrate between the first data and the second data without credit information or a fixed allocation.

In an example, the first transmitter is to output: a first portion of a first packet with a transmit identifier having a first value; a second portion of the first packet with the transmit identifier having the first value; and at least a portion of a second packet with the transmit identifier having a second value.

In an example, the first transmitter is adapted to toggle the transmit identifier at a first rate and a second transmitter is adapted to toggle a transmit identifier associated with third data output by the second transmitter at a second rate, to control a bandwidth of the interconnect allocated to the first transmitter and the second transmitter.

In another example, a method comprises: storing first data from a first source in a first buffer of an arbiter, the first data associated with a first identifier; storing second data from a second source in a second buffer of the arbiter, the second data associated with a second identifier; and selecting the first data for output from the arbiter, based at least in part on a transition in a state of the first identifier.

In an example, the method further comprises selecting third data from the first source in the first buffer for output from the arbiter following the first data if the third data is associated with a first identifier having the same state as the first identifier associated with the first data.

In an example, the method further comprises selecting fourth data from the second source in the second buffer for output from the arbiter following the first data if the fourth data is associated with a second identifier having the same state as the first identifier associated with the first data.

In an example, the method further comprises: receiving the first data from a first core coupled to the arbiter, the first source comprising the first core; and receiving the second data from a third arbiter coupled to the arbiter, the second source comprising the third arbiter.

In an example, the method further comprises arbitrating between the first data and the second data without a fixed allocation setting or credit information.

In an example, the method further comprises preventing the first source from sending further data to the arbiter if the first buffer is full.

In an example, the method further comprises: outputting the first data to a second arbiter coupled to the arbiter; and receiving a control signal from the second arbiter and not outputting additional data to the second arbiter until the control signal is de-asserted.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, an integrated circuit comprises: a first core; a second core; a graphics engine; an interconnect coupled to the first core, the second core, and the graphics engine; and a distributed arbitration system associated with the interconnect. The distributed arbitration system may include: a first arbiter coupled to at least the first core to select from a first plurality of information blocks a first information block sent from the first core based at least in part on a transition in a state of a first indicator associated with the first information block, and to send the first information block to a second arbiter; and the second arbiter coupled to at least the second core to select from a second plurality of information blocks a second information block sent from the first arbiter based at least in part on a transition in a state of a second indicator associated with the second information block, and to send the second information block to a destination.

In an example, the first core is to output a first portion of the first information block with the first indicator having a first state, output a second portion of the first information block with the first identifier having the first state, and output at least a portion of a third information block with the first identifier having a second state.

In an example, the integrated circuit further comprises a third core, where the second arbiter is further coupled to the third core, the second arbiter comprising a first queue to store third information blocks from the third core, a second queue to store fourth information blocks from the first arbiter, and an arbitration circuit to select for output one of the third information blocks and thereafter output one of the fourth information blocks, based on a common state of a third indictor associated with the one of the third information blocks of a fourth indicator associated with the one of the fourth information blocks.

In another example, an apparatus for distributed arbitration comprises: first transmitter means for outputting first data and a transmit identifier associated with the first data; and first arbiter means coupled to the first transmitter for receiving the first data and for arbitrating between the first data and second data from second arbiter means coupled to the first arbiter means, based at least in part on a change in a state of the transmit identifier.

In an example, the first arbiter means comprises: first queue means for storing the first data; and second queue means for storing the second data.

In an example, the first arbiter means further comprises selection means for selecting and outputting a first packet having at least a portion of the first data, based on the change in the state of the transmit identifier associated with the first packet.

In an example, the selection means for selecting and outputting a second packet having at least a portion of the second data, based at least in part on a change in a state of a transmit identifier associated with the second packet, where the transmit identifier associated with the first packet and the transmit identifier associated with the second packet are of the same value.

In an example, the second arbiter means is downstream with respect to the first arbiter means, and where the second arbiter means for arbitrating between data from another transmitter means coupled to the second arbiter means and data from another arbiter means coupled to the second arbiter means, and sending the second data to the second queue means of the first arbiter means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A distributed arbitration system for an interconnect comprising:
    a first transmitter to output first data and a transmit identifier associated with the first data; and
    a first arbiter coupled to the first transmitter to receive the first data and to arbitrate between the first data and second data from a second arbiter coupled to the first arbiter, based at least in part on a change in a state of the transmit identifier, the first arbiter comprising a first queue to store the first data and a second queue to store the second data.

2. The distributed arbitration system of claim 1, wherein the first arbiter further comprises a selection logic to select and output a first packet having at least a portion of the first data, based on the change in the state of the transmit identifier associated with the first packet.

3. The distributed arbitration system of claim 2, wherein the selection logic is to thereafter select and output a second packet having at least a portion of the second data, based at least in part on a change in a state of a transmit identifier associated with the second packet, wherein the transmit identifier associated with the first packet and the transmit identifier associated with the second packet are of the same value.

4. The distributed arbitration system of claim 1, further comprising the second arbiter, wherein the second arbiter comprises a downstream arbiter with respect to the first arbiter, and wherein the second arbiter is to arbitrate between data from another transmitter coupled to the second arbiter and data from another arbiter coupled to the second arbiter, and send the second data to the second queue of the first arbiter.

5. The distributed arbitration system of claim 1, wherein the first queue comprises a plurality of entries each having a packet identifier field to store a packet identifier, a data field to store data of a packet, and a transmit identifier field to store a transmit identifier associated with the packet.

6. The distributed arbitration system of claim 1, further comprising an output buffer coupled to the first arbiter, wherein the first arbiter is to output selected data to the output buffer for communication to one or more destinations.

7. The distributed arbitration system of claim 1, wherein the first arbiter is to arbitrate between the first data and the second data without credit information or a fixed allocation.

8. The distributed arbitration system of claim 1, wherein the first transmitter is to output:
    a first portion of a first packet with a transmit identifier having a first value;
    a second portion of the first packet with the transmit identifier having the first value; and
    at least a portion of a second packet with a transmit identifier having a second value.

9. The distributed arbitration system of claim 1, wherein the first transmitter is adapted to toggle the transmit identifier at a first rate and a second transmitter is adapted to toggle a transmit identifier associated with third data output by the second transmitter at a second rate, to control a bandwidth of the interconnect allocated to the first transmitter and the second transmitter.

10. A non-transitory machine-readable medium having stored thereon instructions, which if performed by a machine cause the machine to perform a method comprising:
    storing first data from a first source in a first buffer of an arbiter, the first data associated with a first identifier;
    storing second data from a second source in a second buffer of the arbiter, the second data associated with a second identifier;
    selecting the first data for output from the arbiter, based at least in part on a transition in a state of the first identifier; and
    selecting third data from the first source in the first buffer for output from the arbiter following the first data if the third data is associated with a first identifier having the same state as the first identifier associated with the first data.

11. The non-transitory machine-readable medium of claim 10, wherein the method further comprises selecting fourth data from the second source in the second buffer for output from the arbiter following the first data if the fourth data is associated with a second identifier having the same state as the first identifier associated with the first data.

12. The non-transitory machine-readable medium of claim 10, wherein the method further comprises:
    receiving the first data from a first core coupled to the arbiter, the first source comprising the first core; and receiving the second data from a third arbiter coupled to the arbiter, the second source comprising the third arbiter.

13. The non-transitory machine-readable medium of claim 10, wherein the method further comprises arbitrating between the first data and the second data without a fixed allocation setting or credit information.

14. The non-transitory machine-readable medium of claim 10, wherein the method further comprises preventing the first source from sending further data to the arbiter if the first buffer is full.

15. The non-transitory machine-readable medium of claim 10, wherein the method further comprises:
    outputting the first data to a second arbiter coupled to the arbiter; and
    receiving a control signal from the second arbiter and not outputting additional data to the second arbiter until the control signal is de-asserted.

16. An integrated circuit comprising:
    a first core;
    a second core;
    a graphics engine;
    an interconnect coupled to the first core, the second core, and the graphics engine; and
    a distributed arbitration system associated with the interconnect, the distributed arbitration system comprising:
        a first arbiter coupled to at least the first core, the first arbiter to select from a first plurality of information blocks a first information block sent from the first core based at least in part on a transition in a state of a first indicator associated with the first information block, the first arbiter to send the first information block to a second arbiter; and
        the second arbiter coupled to at least the second core, the second arbiter to select from a second plurality of information blocks a second information block sent from the first arbiter based at least in part on a transition in a state of a second indicator associated with the second information block, the second arbiter to send the second information block to a destination.

17. The integrated circuit of claim 16, wherein the first core is to output a first portion of the first information block with the first indicator having a first state, output a second portion of the first information block with the first indicator having the first state, and output at least a portion of a third information block with a third indicator having a second state.

18. The integrated circuit of claim 16, further comprising a third core, wherein the second arbiter is further coupled to the third core, the second arbiter comprising a first queue to store third information blocks from the third core, a second queue to store fourth information blocks from the first arbiter, and an arbitration circuit to select for output one of the third information blocks and thereafter output one of the fourth information blocks, based on a common state of a third indicator associated with the one of the third information blocks and a fourth indicator associated with the one of the fourth information blocks.

* * * * *